(12) United States Patent
Fujino et al.

(10) Patent No.: US 7,048,427 B2
(45) Date of Patent: May 23, 2006

(54) PLANAR LIGHT SOURCE DEVICE AND IMAGE READING DEVICE

(75) Inventors: Kouzou Fujino, Osaka (JP); Ryo Anraku, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 10/443,563

(22) Filed: May 22, 2003

(65) Prior Publication Data

US 2003/0218874 A1 Nov. 27, 2003

(30) Foreign Application Priority Data

May 23, 2002 (JP) .............................. 2002-149544

(51) Int. Cl.
*F21V 7/04* (2006.01)
(52) U.S. Cl. ...................... 362/621; 362/330; 385/901; 349/65
(58) Field of Classification Search ................... 362/31, 362/27, 29, 330, 621; 349/64, 65; 385/901
See application file for complete search history.

(56) References Cited

U.S. PATENT DOCUMENTS 5,528,709 A * 6/1996 Koike et al. .................. 385/14
6,746,129 B1 * 6/2004 Ohkawa ....................... 362/31

FOREIGN PATENT DOCUMENTS

JP 02001184923 A * 7/2001

* cited by examiner

*Primary Examiner*—John Anthony Ward
(74) *Attorney, Agent, or Firm*—RatnerPrestia

(57) ABSTRACT

A planar light source device comprises a light guide member having light scattering members for scattering light on the rear face of it, and a first LED module and a second LED module arranged on an end face of the light guide member. The light guide member has an area having no light scattering members in the vicinity of the LED modules, and has a corner-cut portion obtained by cutting a corner at an inclination angle $\theta$ in the light outputting direction of the first LED module. The first LED module is provided in the middle of the short side face of the light guide member, and the second LED module is provided on the corner-cut portion of the light guide member. The light from the first and second LED modules is outputted into an area where light scattering members are sparse.

12 Claims, 21 Drawing Sheets

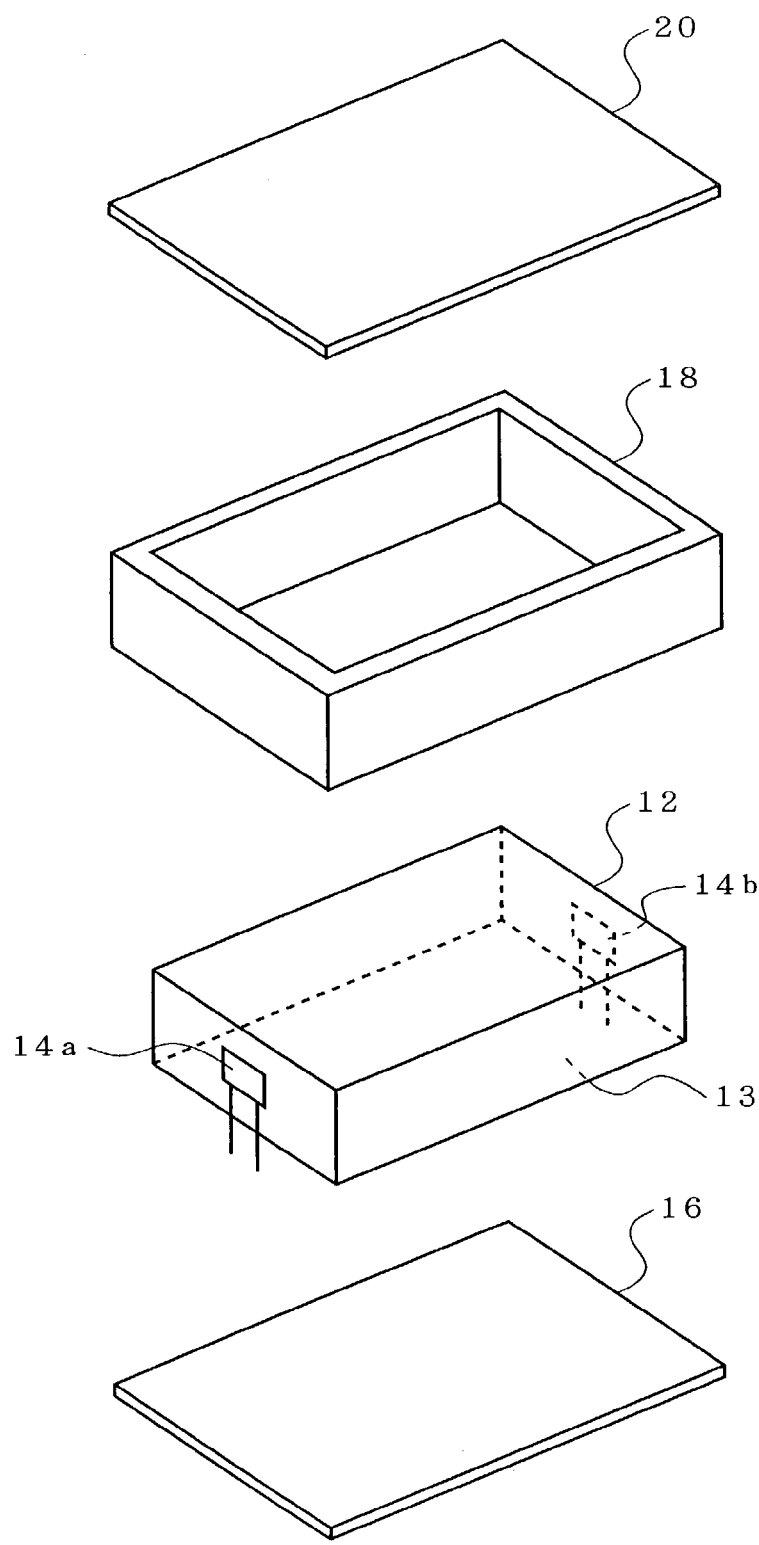
F I G. 1

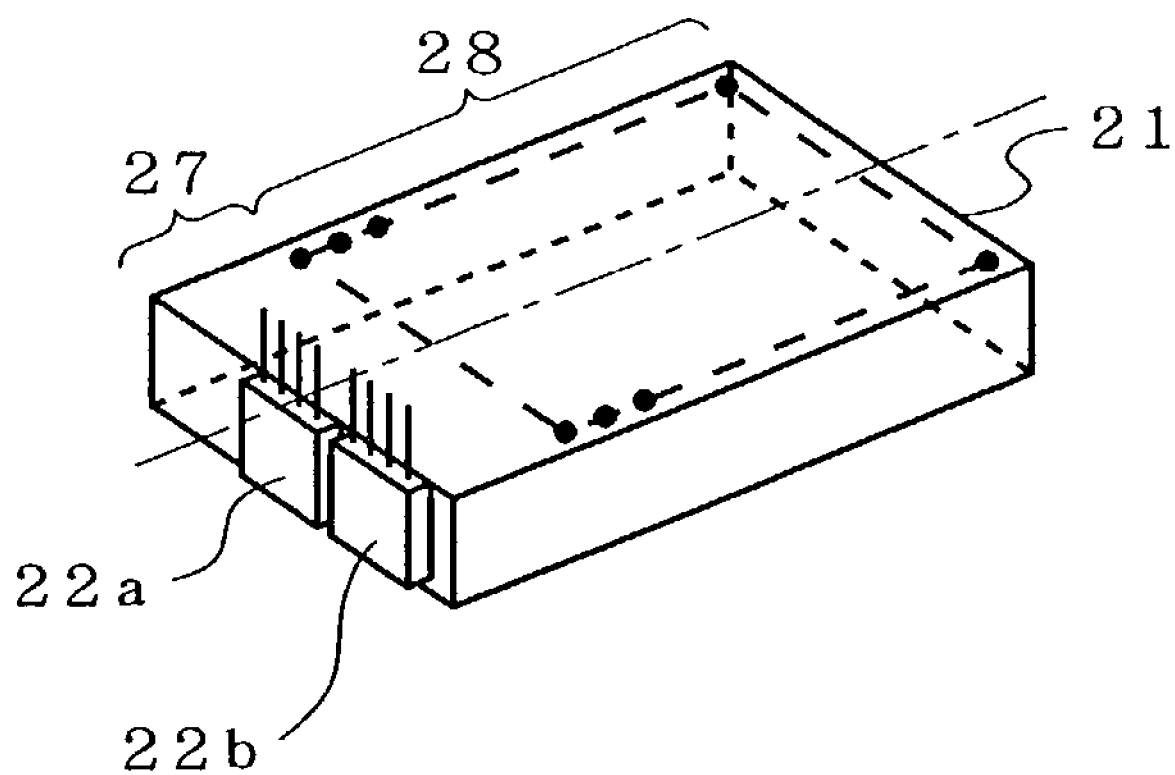
F I G. 3

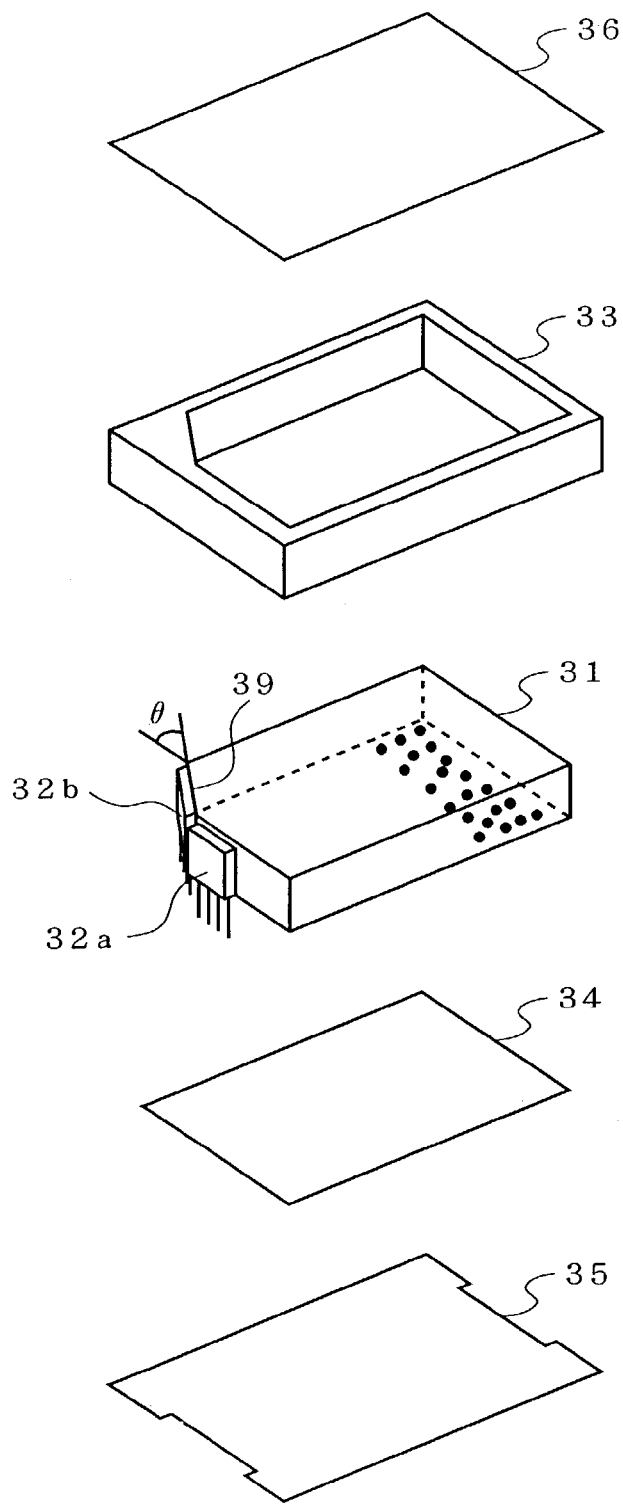
F I G . 1 3

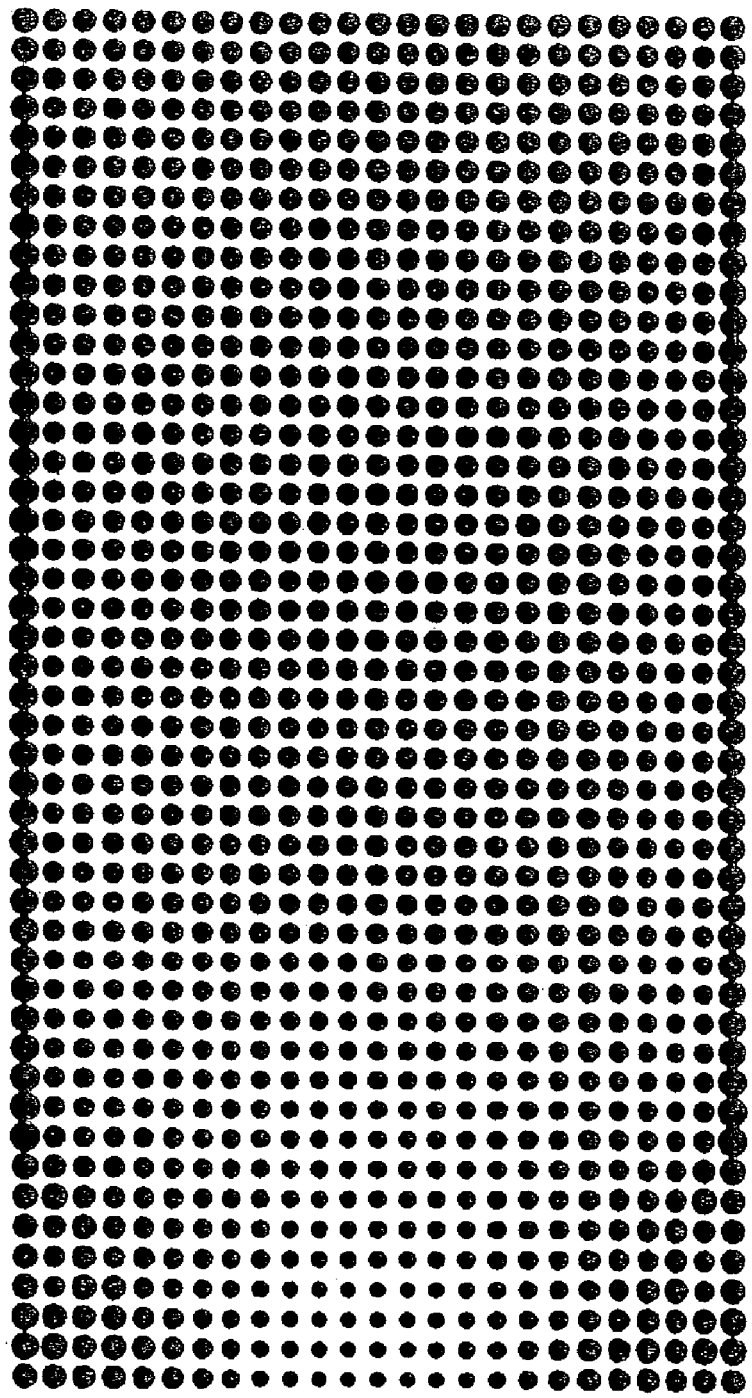
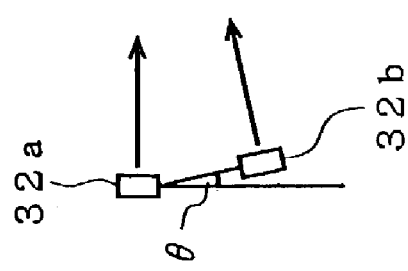
FIG. 15

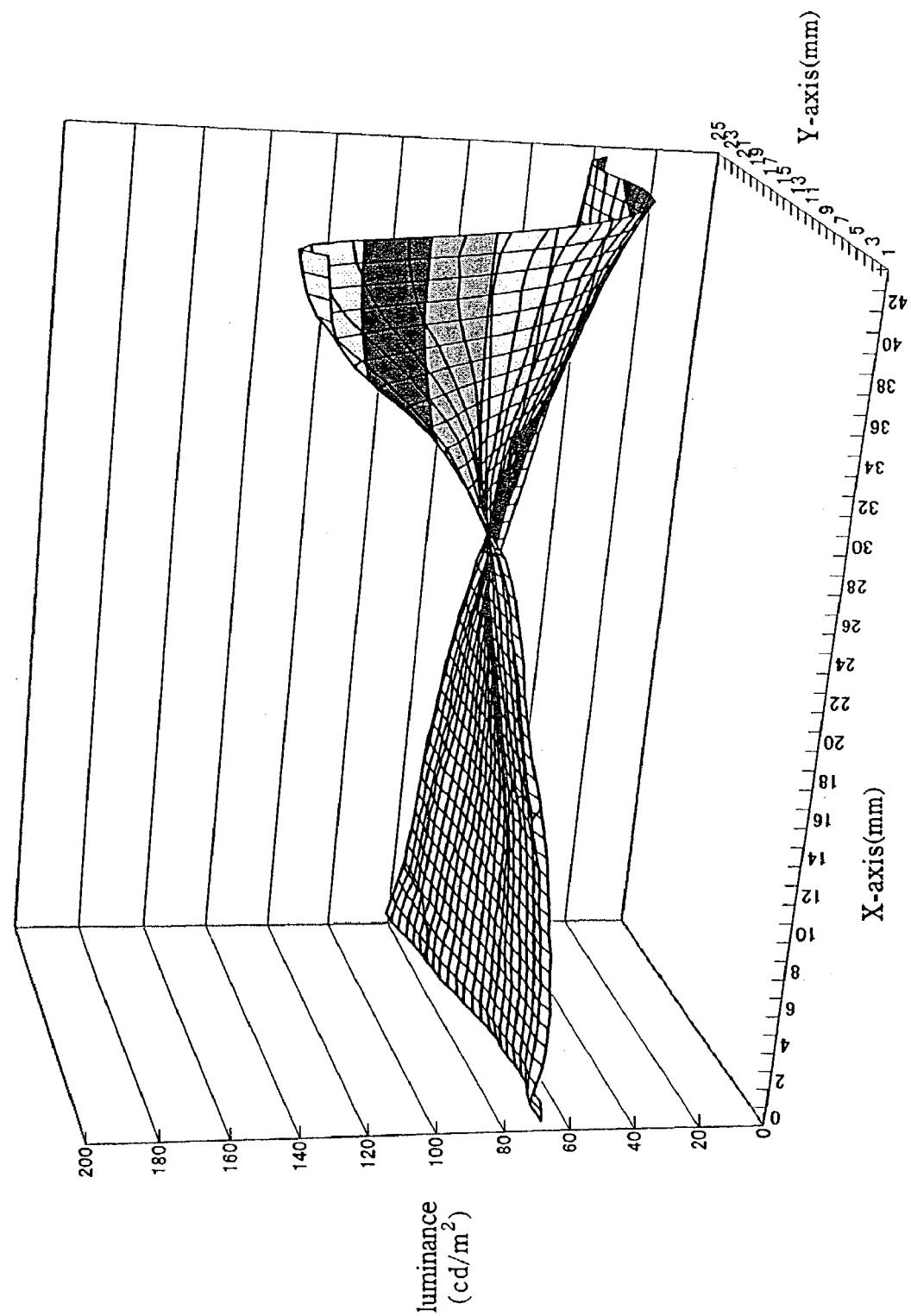
F I G. 1 9

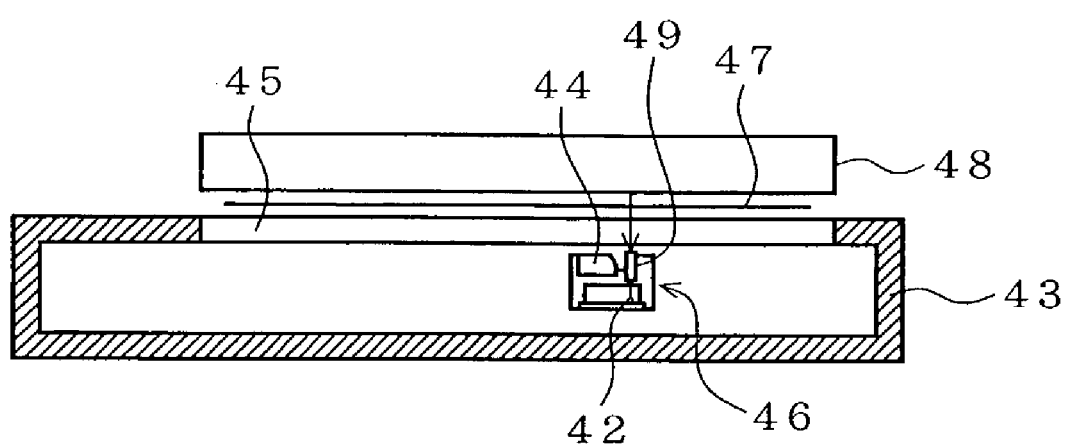
F I G . 2 2

PLANAR LIGHT SOURCE DEVICE AND IMAGE READING DEVICE

BACKGROUND OF THE INVENTION

1. Field of the Invention

The present invention relates to a planar light source device making the rear face of a light guide member have a light scattering function and uniformly outputting light to the outside, and an image reading device utilizing the same planar light source device.

2. Related Art

Up to now, as a planar light source device there has been known for example a light source device disclosed in Japanese Patent Laid-Open Publication No. 2001-34,210. A planar light source device disclosed in this patent publication is shown in FIG. 1. The planar light source device shown in FIG. 1 comprises a planar light guide member 12 made of transparent acrylic resin, and this planar light guide member 12 comprises LED light sources 14a and 14b respectively in the middle of the short sides being opposite to each other. And light scattering members are formed all over the rear face 13 of the planar light guide member 12. The bottom face of the planar light guide member 12 is covered with a white bottom plate 16, and four side faces are covered with a white case frame 18. A diffuser sheet 20 is adhered to the top face (light emitting face) of the planar light guide member 12.

This planar light source device uses a mechanism making the light from a point light source enter a planar light guide member made of a transparent material and uniformly emitting light from its two-dimensional planar portion in order to convert the light from an LED light source to be considered as a point light source into distributed light from a planar light source.

In addition, an arrangement having one point light source on each of both sides opposite to each other of a planar light guide member makes an in-surface luminance distribution provided by the quantity of light of one light source and an in-surface luminance distribution provided by the quantity of light of the other light source compensate each other and finally obtains a uniform luminance distribution with the in-surface luminance distribution obtained by adding both the in-surface luminance distributions to each other.

However, when attempting to increase the number of colors or the quantity of light by increasing the number of LED light sources in a planar light source device as described above, the following problems occur.

In order to uniformly emit light from a two-dimensional planar portion by converting the light from a point light source into the distributed light from a planar light source, it is necessary to form light scattering members very accurately adjusted on the rear face of a planar light guide member. However, light scattering members formed on the rear face of a planar light guide member are ordinarily adjusted so as to uniformly scatter only the light from a single LED module (light emitted from nearly one point). The adjustment for coping with light emitted from one point (a point light source) makes the adjustment of light out of order in relation to a new point light source newly provided adjacently to the said one point light source, and as a result the distribution of luminance of a planar light source is made irregular, and therefore it is difficult to mount a plurality of LED modules at some intervals.

Accordingly, the number of LED modules to be mounted on a planar light guide member is limited to one by such restrictions as described above, ordinarily, a single LED module (for example, Model NSCM315C made by Nichia Chemical Industrial Co.) has three LED chips of R (red), G (green) and B (blue) mounted on it. Mounting more chips than this causes a heat generating element to be confined in a substrate limited in area, makes the whole substrate rise in temperature due to an insufficient cooling action, and degrades the LED's in optical performance. Accordingly, for example, an LED module mounted with LED's of three kinds of R, G and B cannot be ordinarily mounted with chips other than them at the same time, and therefore results in becoming a planar light source having chips limited (in number or color). That is to say, it is difficult to make a light source multicolor or increase the quantity of light.

Here, in case of providing light sources on both face sides of a planar light guide member being opposite to each other, only the same kind of light sources can make a luminance distribution uniform as a whole. Only arranging the same kind of point light sources opposite to each other provides a planar light emission being uniform due to integration of light quantity, and arranging different kinds of point light sources opposite to each other results in making an abnormal in-surface distribution of light quantity due to no integration.

Further, in case of LED light sources, even LED's of the same kind have variations in light quantity. In case of LED light sources, even products of the same kind ordinarily have large variations in light quantity and have a maximum-to-minimum ratio of 3 to 4 in optical output in their specifications, and the combination of LED's being different in optical output cannot bring a uniform distribution of light quantity due to unbalanced weighting in integration.

The present invention has been performed in order to solve such conventional problems and an object of it is to provide a planar light source device making it possible to use LED light sources of many kinds (many colors), many LED light sources of the same color (increased in light quantity) or combination of them by arranging a plurality of LED light sources on an end face of a light guide member, and an image reading device utilizing the same planar light source device.

SUMMARY OF THE INVENTION

A planar light source device of the present invention is characterized by a planar light source device comprising a light guide member having light scattering members for scattering light on the rear face of it and a plurality of light sources to be arranged on an end face of said light guide member, wherein said light guide member has an area having no light scattering members in the vicinity of said light sources on the rear face of the light guide member, introduces the light outputted from said light sources into said light guide member and outputs the light scattered by said light scattering members from the light emitting face of said light guide member.

A planar light source device of the present invention is characterized by a planar light source device comprising a light guide member having light scattering members for scattering light on the rear face of it and a plurality of light sources to be arranged on an end face of said light guide member, wherein said light guide member introduces the light outputted from said light sources to an area being smaller in area occupied by light scattering members per unit area in an area having light scattering members on the rear face of the light guide member into the light guide member and outputs the light scattered by said light scattering members from the light emitting face of the light guide member.

In addition, a planar light source device of the present invention is characterized by a planar light source device comprising a light guide member having light scattering members for scattering light on the rear face of it and a plurality of light sources to be arranged on an end face of said light guide member, wherein said light guide member has an area having no light scattering members in the vicinity of said light sources on the rear face of the light guide member, introduces the light outputted from said light sources to an area being smaller in area occupied by light scattering members per unit area in an area having light scattering members on the rear face of the light guide member into the light guide member and outputs the light scattered by said light scattering members from the light emitting face of the light guide member.

BRIEF DESCRIPTION OF THE DRAWINGS

FIG. 1 is an exploded perspective view showing a conventional planar light source device.

FIG. 3 is a perspective view of a light guide member seen from the rear face (printed face) direction.

FIG. 13 is an exploded perspective view showing a second embodiment of a planar light source device according to the present invention.

FIG. 15 is a diagram showing the relative positions of a light scattering member pattern formed on a printed area of the rear face of the light guide member and LED modules.

FIG. 19 is a diagram showing the optical characteristic of the second LED module in case that the face having the second LED module installed on it is not inclined to the face having the first LED module installed on it.

FIG. 22 is a diagram showing an image reading device utilizing a planar light source device according to the first or second embodiment.

DETAILED DESCRIPTION OF THE PREFERRED EMBODIMENTS

Next, a first embodiment of the present invention is described with reference to the drawings.

Figure 2:
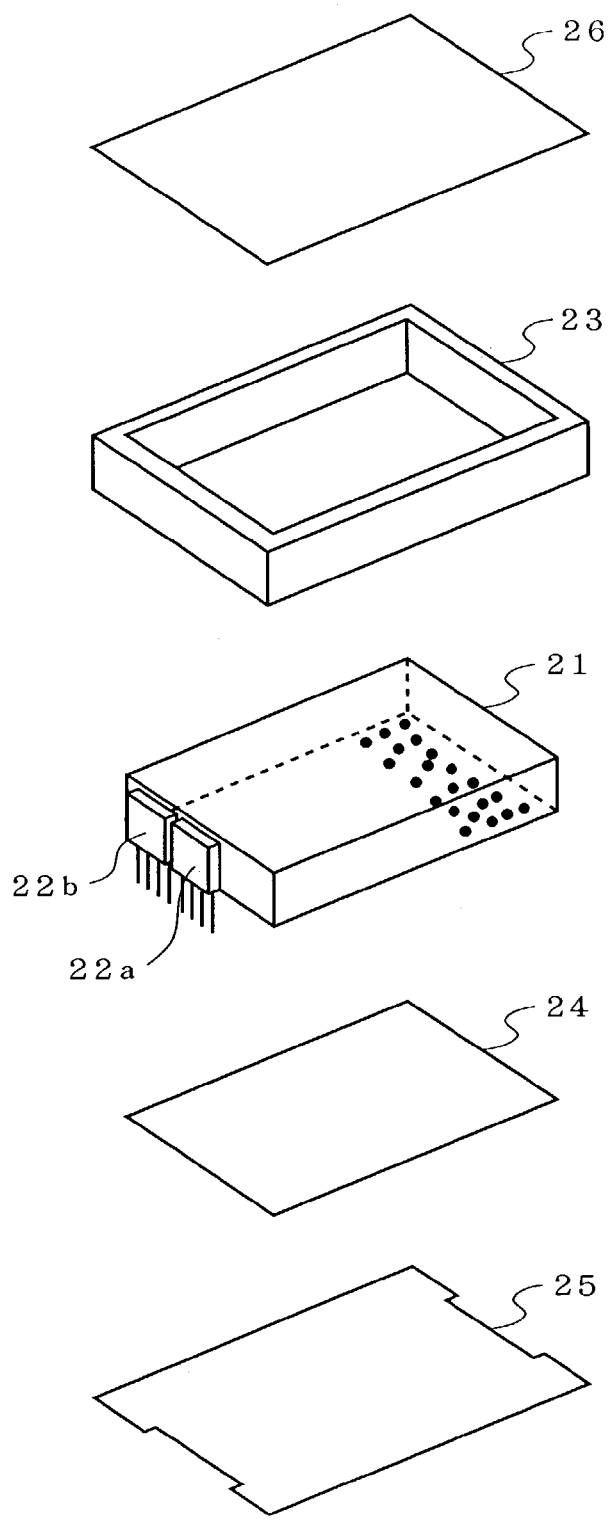
FIG. 2 is an exploded perspective view showing a first embodiment of a planar light source device according to the present invention.

FIG. 2 is an exploded perspective view showing a first embodiment of a planar light source device according to the present invention. A planar light source device shown in FIG. 2 is composed of a planar transparent light guide member 21, a case frame 23 for covering the four side faces of the light guide member 21, a high-reflectivity reflector plate 24 to be arranged on the rear face of the light guide member 21, a bottom plate 25 to be arranged on the rear face of the reflector plate 24 and an optical diffuser sheet 26 to be arranged on the top face (light emitting face) of the light guide member 21.

The light guide member 21 is provided with a first LED module 22a and a second LED module 22b which are light sources for inputting light into the light guide member 21 through an end face of it.

The first LED module 22a is provided in the middle of a short side face of the light guide member 21, the second LED module 22b is provided between the middle and the end of the short side face of the light guide member 21, and the first LED module 22a and the second LED module 22b have the same exit angle of light. The first LED module 22a and the second LED module 22b each have three LED's of R (red), G (green) and B (blue) being close to one another inside it.

The light guide member 21 is 27 mm×50 mm×3.5 mm in size and is made of transparent acrylic resin. A light scattering member pattern comprising white circular dots is formed by printing on the rear face of the light guide member 21.

A white polycarbonate material is used as the case frame 23 for covering the light guide member and as the bottom plate 25, and an optical diffuser film (100GM2 made by Kimoto) is used as the optical diffuser sheet 26.

The reflector plate 24 may be provided between the light guide member 21 and the bottom plate 25, and is made of a high-reflectivity material such as a mirror or aluminum thin film for example. It is preferable that the reflectivity (reflected light/incident light) of the reflector plate 24 is not less than 90%.

FIG. 3 is a perspective view of the light guide member 21 seen from the rear face (printed face) side. The rear face of the light guide member 21 is composed of an area having no light scattering members (or area little scattering light), namely, an ineffective area 27 and a printed area 28 having a light scattering member pattern comprising white circular dots printed on it, as shown in FIG. 3. The ineffective area 27 is provided in the vicinity of the first and second LED modules 22a and 22b, while the printed area is provided at a certain distance from the first and second LED modules 22a and 22b.

Figure 4:
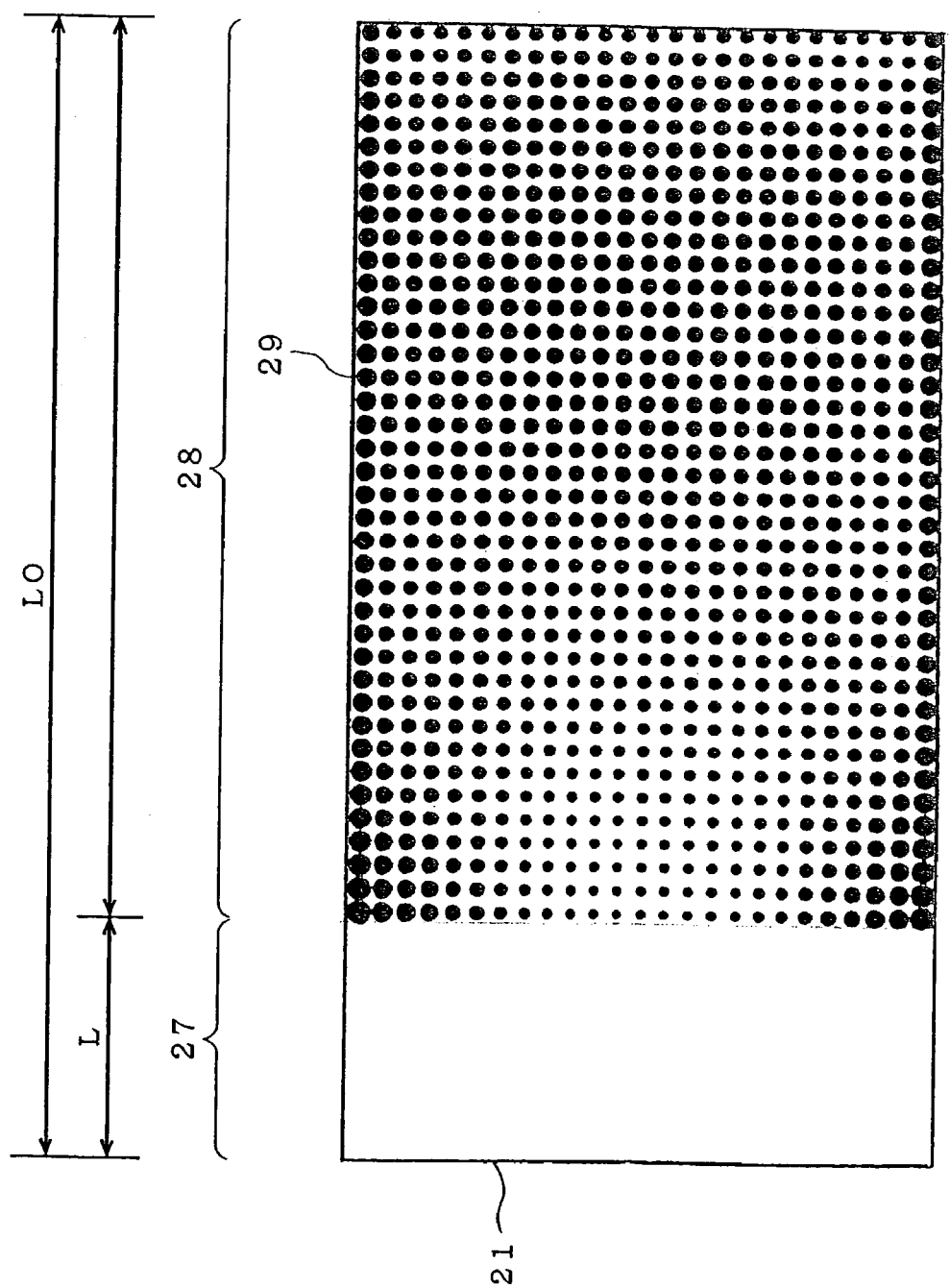
FIG. 4 is a diagram showing a light scattering member pattern formed on a printed area of the rear face of the light guide member.

FIG. 4 is a diagram showing a light scattering member pattern to be formed in the printed area on the rear face of the light guide member 21. On the rear face of the light guide member 21, a light scattering member pattern shown in FIG. 4 is printed on the printed area 28 being at a certain distance L from the LED modules with the ineffective area 27 between the printed area 28 and the LED modules. It is a white circular dot 29 that is here shown by black, which is high in reflectivity. Although a light scattering member pattern is formed out of circular dots here, it is not necessarily limited to circular dots but may be in many variant shapes such as square, rhombus and the like. In FIG. 4, the length LO of the light guide member in the light outputting direction of the LED modules is 50 mm, and the length L of the ineffective area 27 having no light scattering members in the light outputting direction of the LED modules is 10 mm.

Figure 5:
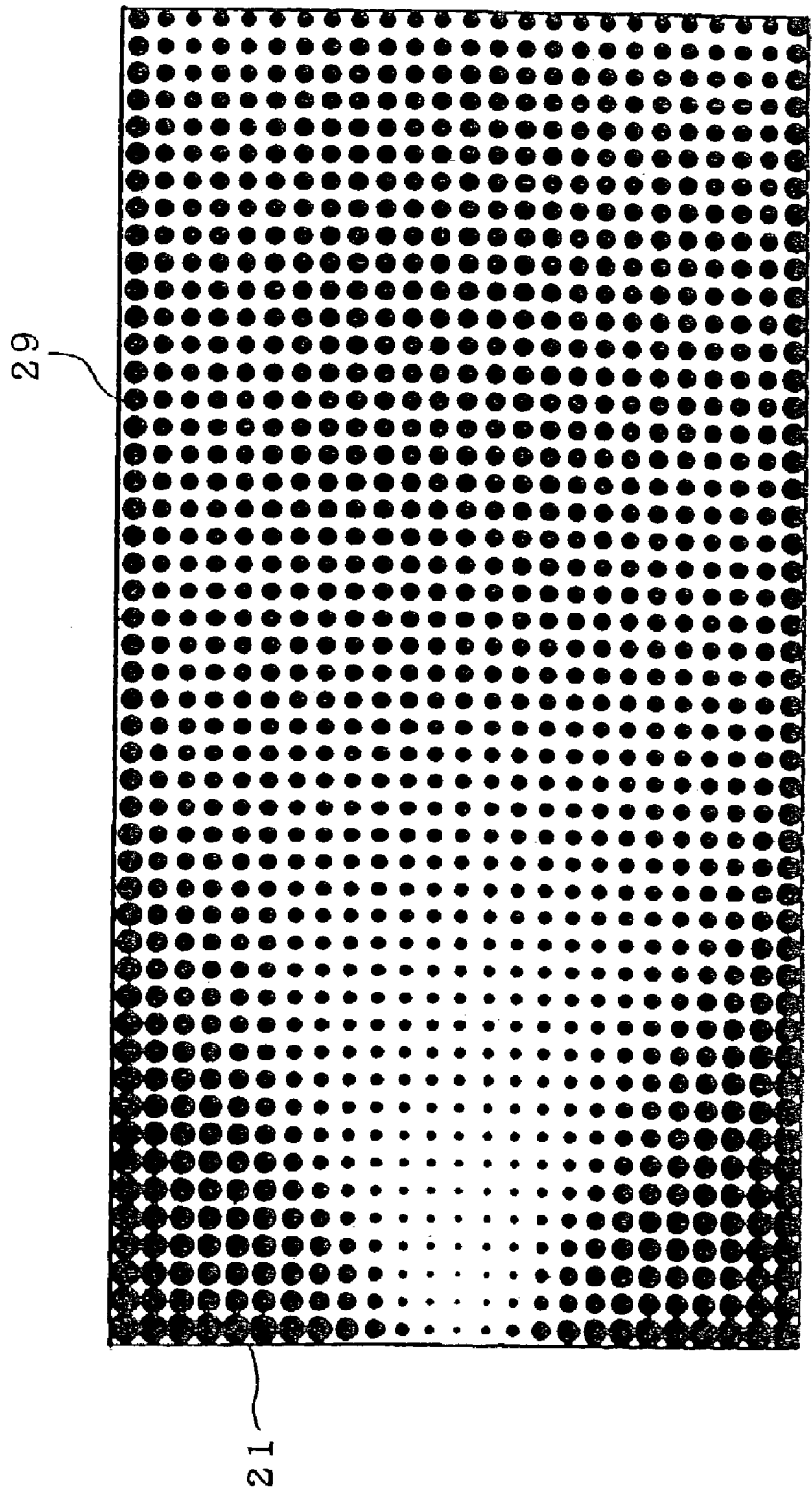
FIG. 5 is a diagram showing a light scattering member pattern formed on the whole rear face of the light guide member.

FIG. 5 is a diagram showing a light scattering member pattern formed on the whole rear face of the light guide member 21 in order to obtain a uniform distribution of emitted light in case of providing only the first LED module 22a in the middle of the short side face of the light guide member 21. The light scattering member pattern shown in FIG. 4 is a light scattering member pattern composed of residual white circular dots 29 left after removing white circular dots 29 being within a certain distance L from the LED module side in the light scattering member pattern shown in FIG. 5.

FIGS. 6 to 11 show results of measuring in-surface luminance distributions obtained by applying an electric current to LED modules to make a planar light source device emit light, said planar light source device having a light emitting surface of 25 mm×47 mm in size and being composed as described above. These LED modules were arranged at a side having a larger numerical value in the x-axis (at the 47-mm side in the figures) of the light guide member. Model BM7 made by Topcon was used as a luminance meter. The case of using LED's of R (red) as the first and second LED modules is described. In FIGS. 6 to 11, a light emitting surface is represented by the x-y coordinates and one corner of the light emitting surface is taken as the origin of the coordinates, and the pitch of measurement is set as 1 mm by dividing the x-axis into 46 equal parts and the y-axis into 23 equal parts. The ordinate represents measured luminance (unit: cd/m$^2$).

Figure 6:
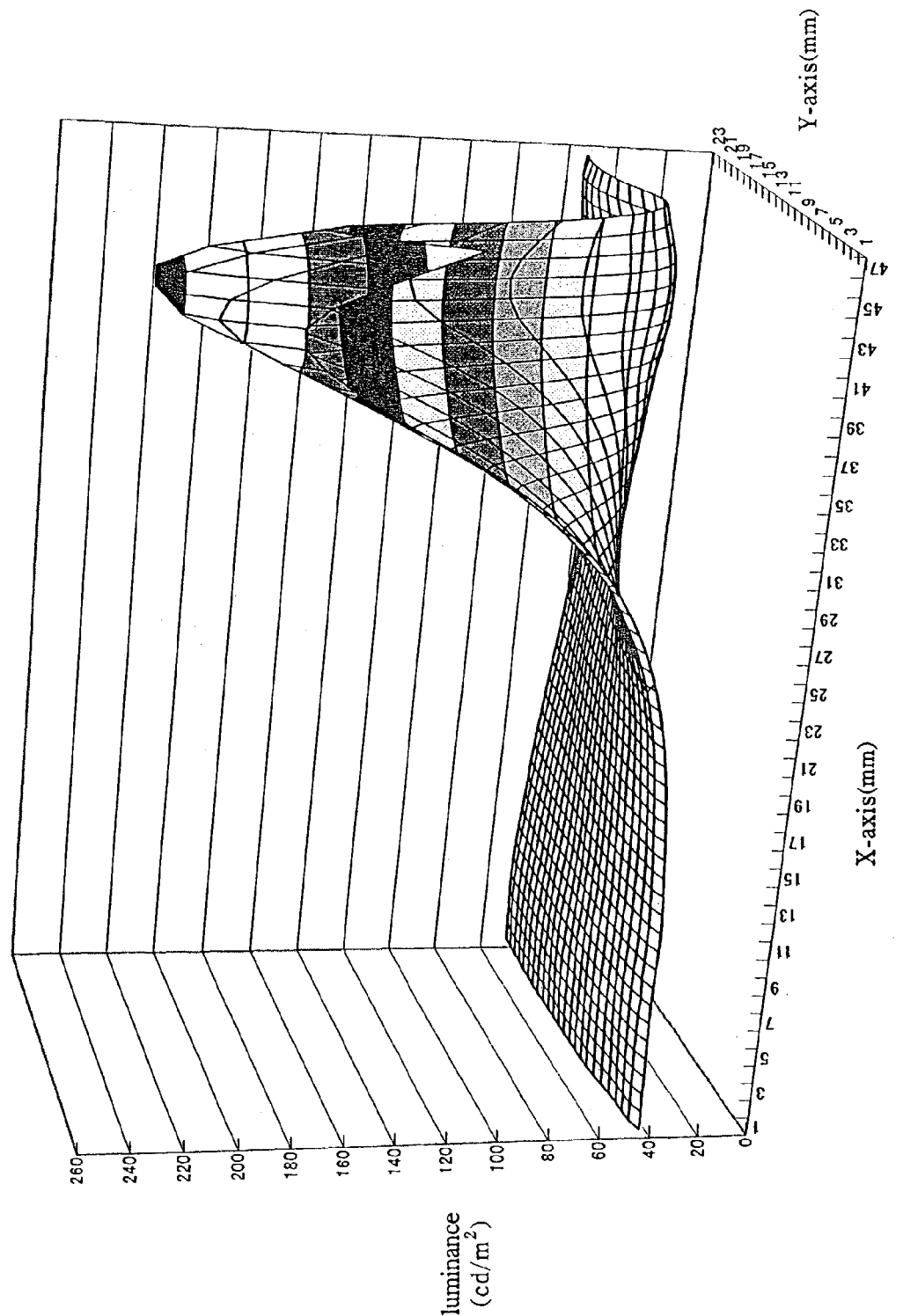
FIG. 6 is a diagram showing the optical characteristic of a second LED module in case of "L=0 mm".
Figure 7:
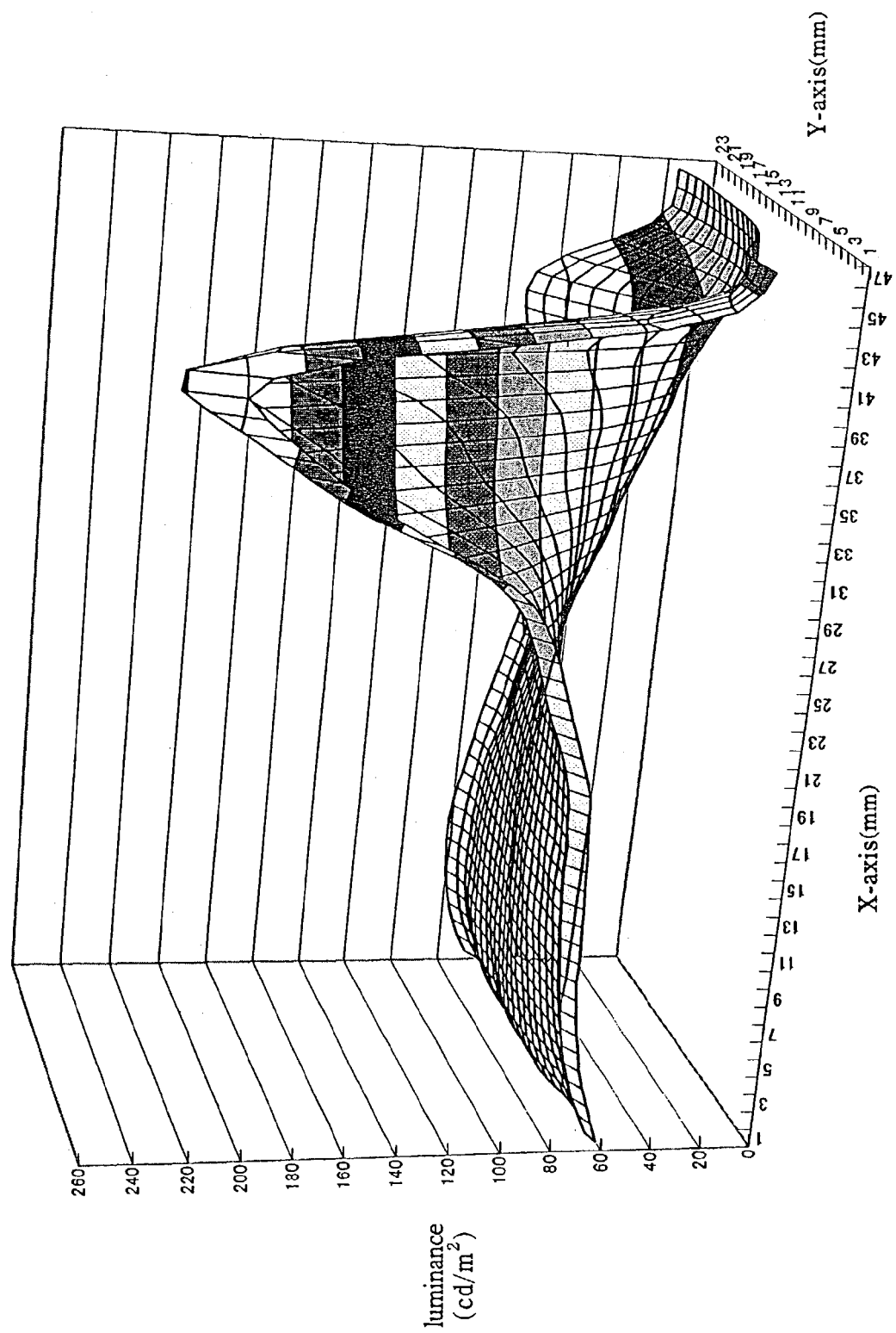
FIG. 7 is a diagram showing the optical characteristic of the second LED module in case of "L=6 mm".
Figure 8:
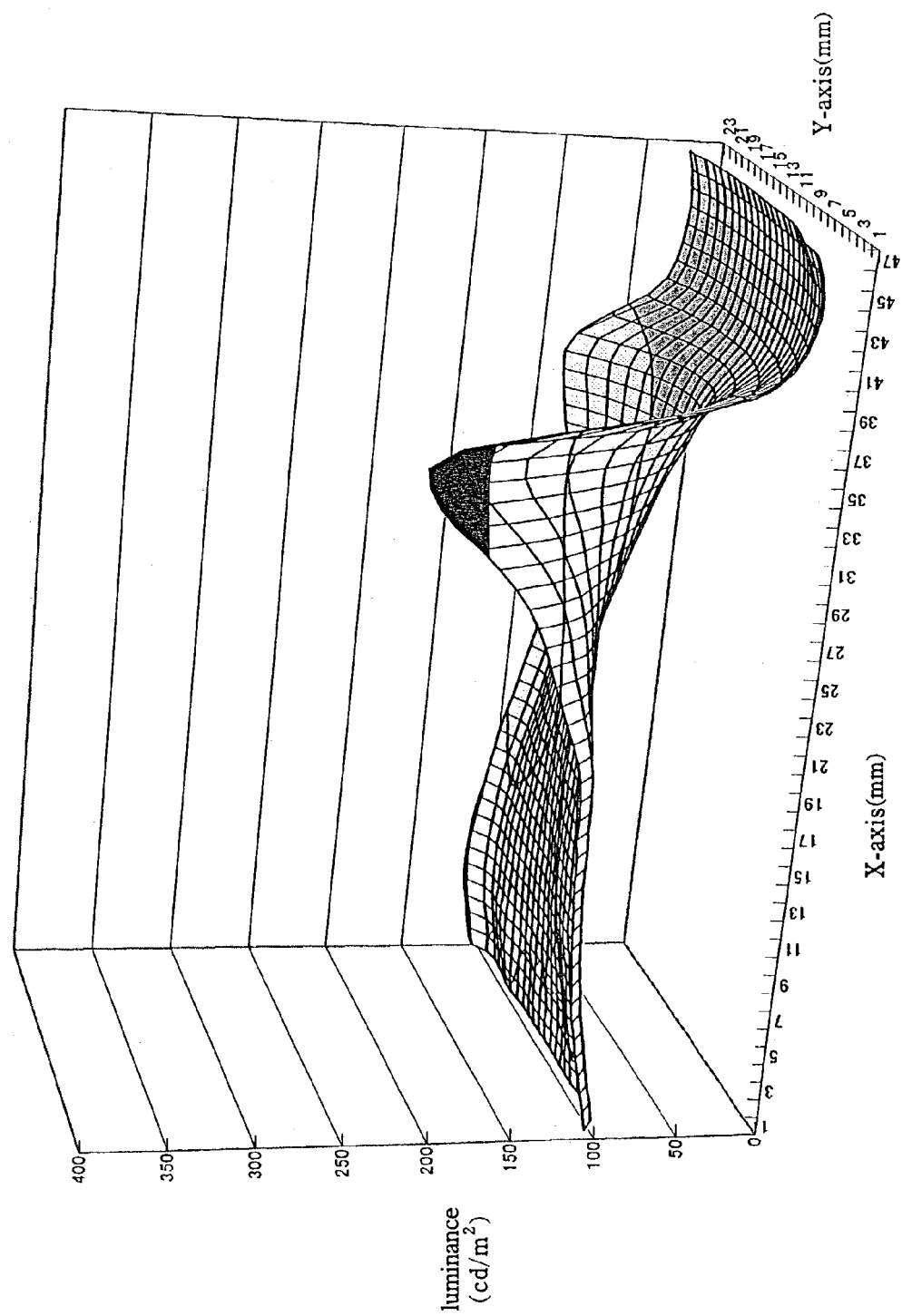
FIG. 8 is a diagram showing the optical characteristic of the second LED module in case of "L=10 mm".

First, the optical characteristic of the second LED module provided between the middle and the end of the short side face of the light guide member is described. FIGS. 6, 7 and 8 show the optical characteristic of the second LED module.

FIG. 6 shows the optical characteristic in case of "L=0 mm", namely, in case of forming a light scattering member pattern on the whole surface of the light guide member, and shows the optical characteristic of the second LED module using the light scattering member pattern shown in FIG. 5.

FIG. 7 shows the optical characteristic in case of "L=6 mm", namely, in case of providing an ineffective area within 6 mm in the vicinity of the LED module, and shows the optical characteristic of the second LED module using a light scattering member pattern obtained by removing white circular dots within a range of 6 mm from the LED module side from the light scattering member pattern of FIG. 5.

FIG. 8 shows the optical characteristic in case of "L=10 mm", namely, in case of providing an ineffective area within a range of 10 mm in the vicinity of the LED module, and shows the optical characteristic of the second LED module using a light scattering member pattern obtained by removing white circular dots within a range of 10 mm from the LED module side from the light scattering member pattern of FIG. 5.

As shown in FIGS. 7 and 8, in the optical characteristic of the second LED module, a huge peak in the vicinity of the LED module was reduced by providing an ineffective area (area having no light scattering member pattern) and the peak was remarkably lowered when the length L of the ineffective area was made to be 10 mm. As a result, the mean value of quantity of light of the rear printed area except the ineffective area was raised and a clearer and more uniform in-surface luminance distribution could be obtained in the effective area. In short, the light which would have been emitted from the light emitting surface through being scattered in the vicinity of a light source by the light scattering member pattern of FIG. 5 is efficiently propagated backward by total reflection by providing an ineffective area.

Figure 9:
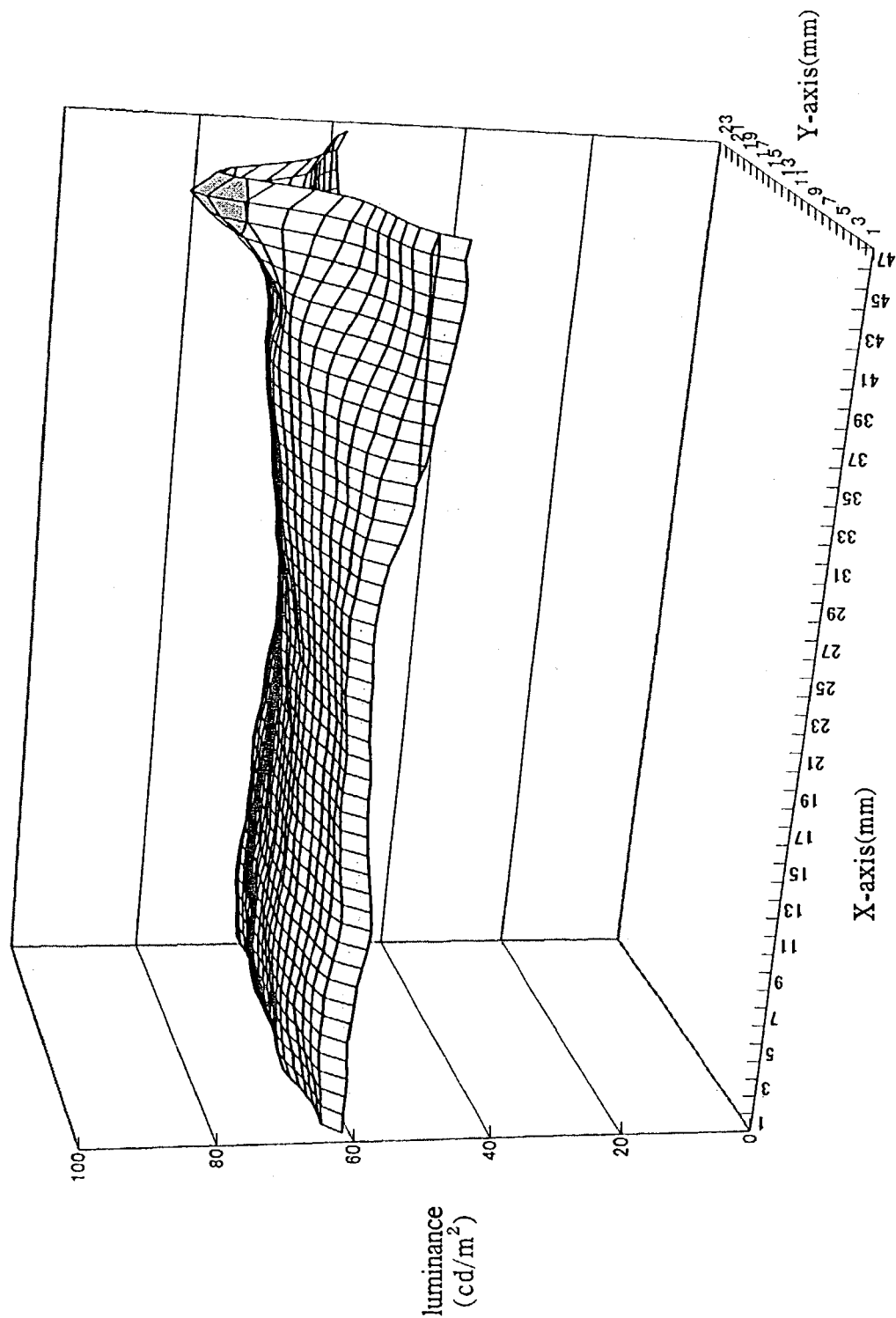
FIG. 9 is a diagram showing the optical characteristic of a first LED module in case of "L=0 mm".
Figure 10:
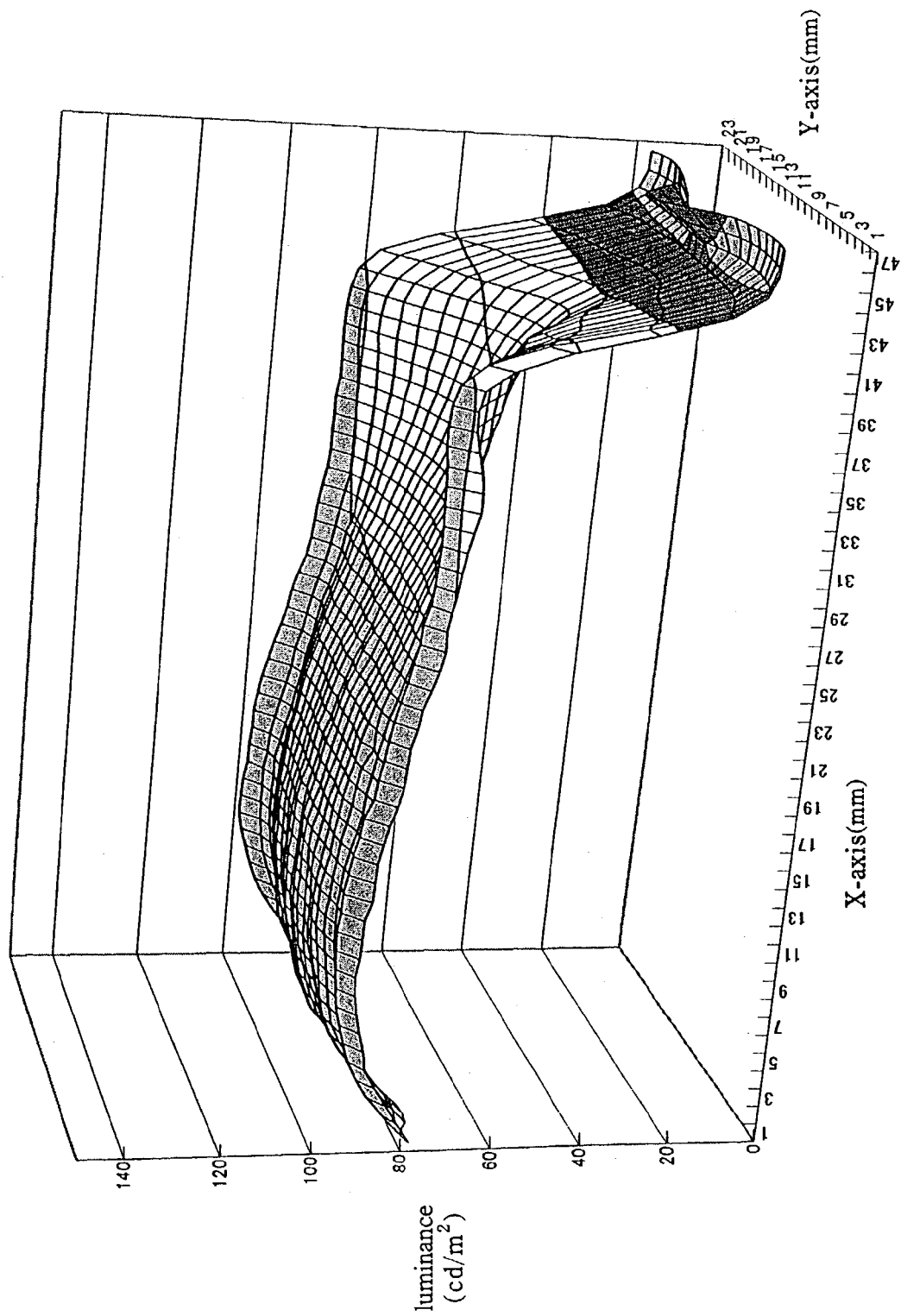
FIG. 10 is a diagram showing the optical characteristic of the first LED module in case of "L=6 mm".
Figure 11:
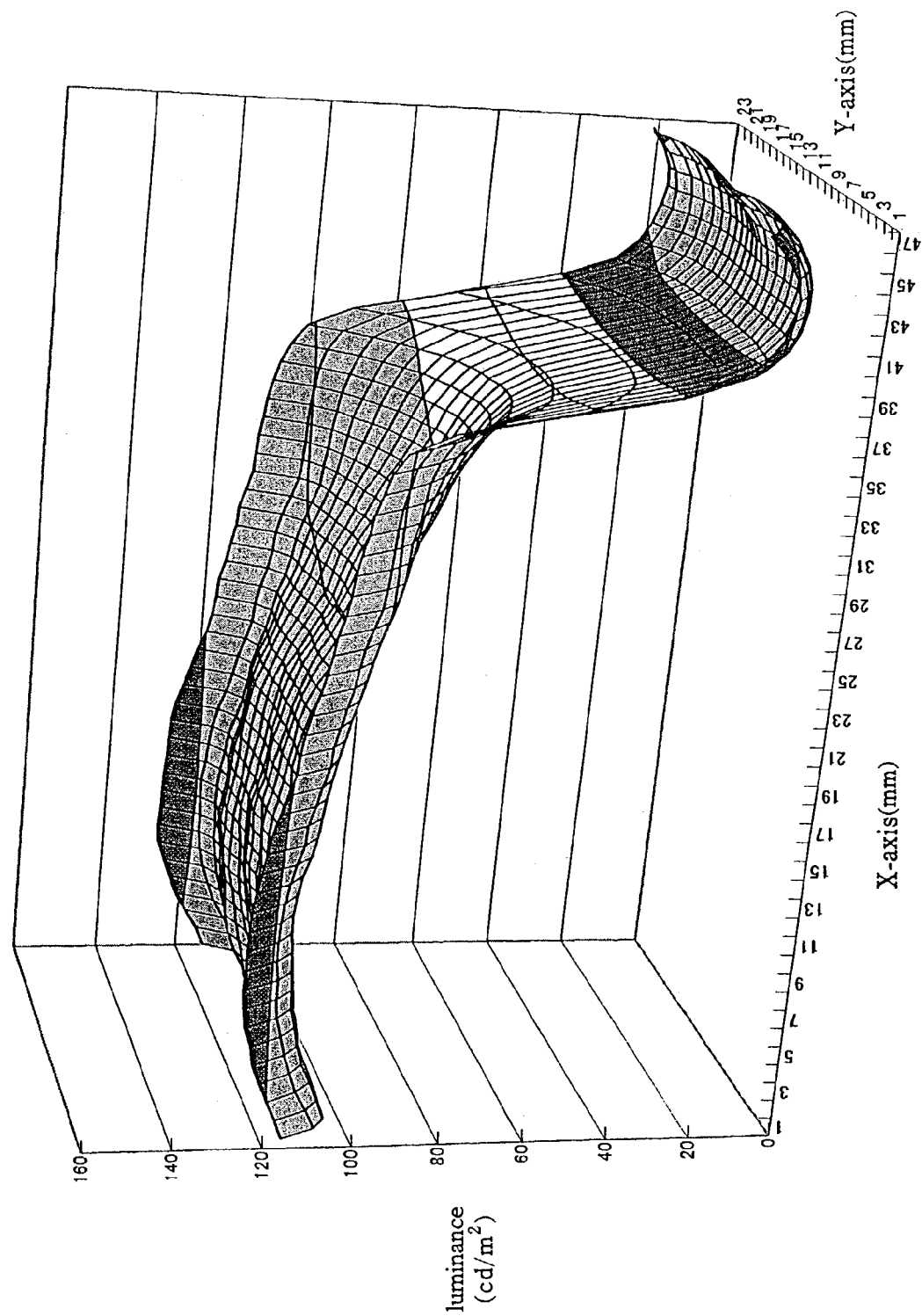
FIG. 11 is a diagram showing the optical characteristic of the first LED module in case of "L=10 mm".

FIGS. 9, 10 and 11 show the optical characteristic of the first LED module provided in the middle of a short side face of the light guide member.

FIG. 9 shows the optical characteristic in case of "L=0 mm", namely, in case of forming a light scattering member pattern on the whole surface of the light guide member, and shows the optical characteristic of the first LED module using the light scattering member pattern shown in FIG. 5.

FIG. 10 shows the optical characteristic in case of "L=6 mm", namely, in case of providing an ineffective area within 6 mm in the vicinity of the LED module, and shows the optical characteristic of the first LED module using a light scattering member pattern obtained by removing white circular dots within a range of 6 mm from the LED module side from the light scattering member pattern of FIG. 5.

FIG. 11 shows the optical characteristic in case of "L=10 mm", namely, in case of providing an ineffective area within a range of 10 mm in the vicinity of the LED module, and shows the optical characteristic of the first LED module using a light scattering member pattern obtained by removing white circular dots within a range of 10 mm from the LED module side from the light scattering member pattern of FIG. 5.

Figure 12:
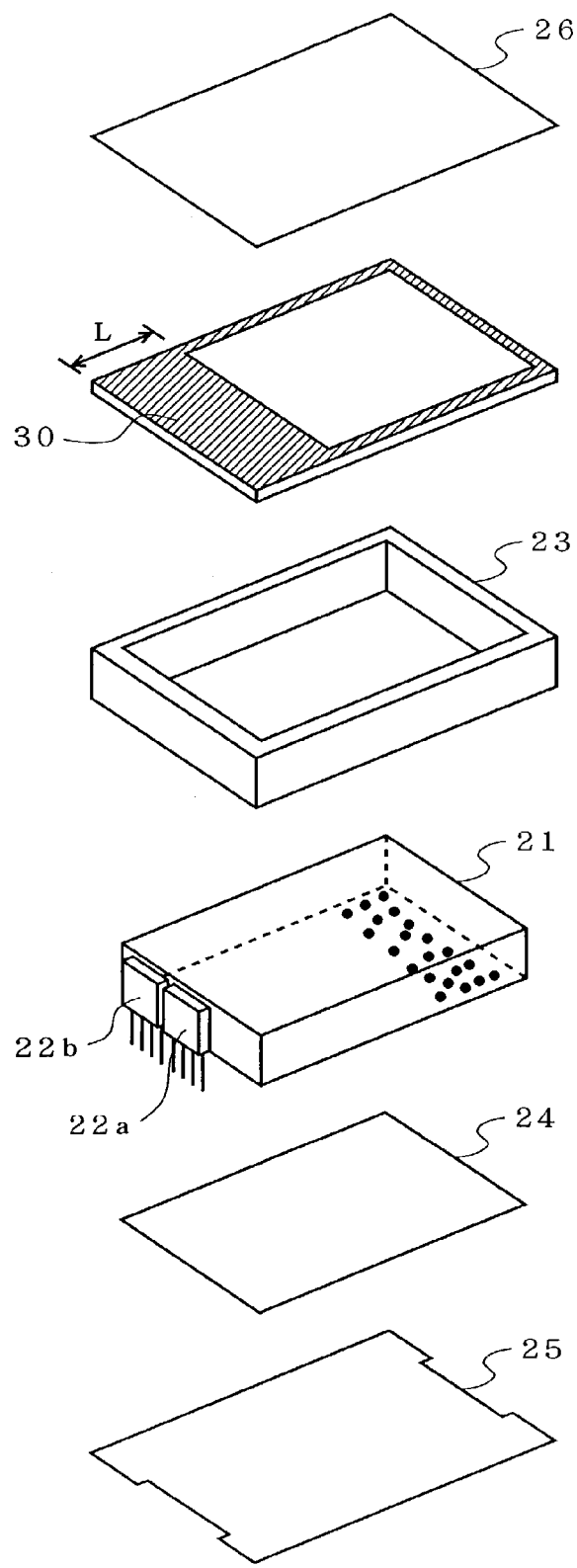
FIG. 12 is an exploded perspective view of a planar light source device provided with a light shielding plate covering an ineffective area at the output face side.

As shown in FIGS. 10 and 11, in the optical characteristic of the first LED module, since the quantity of light is lowered in the vicinity of the LED module by providing an ineffective area (area having no light scattering member pattern), a part being lowered in quantity of light is treated as an ineffective part. With regard to this, as shown in FIG. 12 for example, an area being uneven in luminance is made not to be used by covering the area being uneven in luminance with a light shielding plate 30 for covering an ineffective area, said light shielding plate being provided at the light emitting surface side. And it is possible to prevent a light from leaking in the vicinity of the LED module by providing the light shielding plate 30 for covering the ineffective area.

As described above, the first embodiment can remove the irregularity in luminance distribution made in the vicinity of an LED module by providing an ineffective area having no light scattering members in the vicinity of the LED module in case of arranging a plurality of LED modules having the same exit angle of emitted light on a light guide member. The reason is that providing an ineffective area having no light scattering members in the vicinity of an LED module makes the light scattering members formed more backward than the ineffective area see the LED module (point light source) being at a distance of several millimeters from a comparatively far distance (far beyond the ineffective area), and therefore makes it possible to consider the whole including a plurality of LED modules adjacent to one another as a point light source. And since a light guide member can be provided with a plurality of LED modules, it is possible to realize an LED planar light source using LED's of many kinds and increasing the quantity of light.

Next, a second embodiment of the present invention is described with reference to the drawings.

FIG. 13 is an exploded perspective view showing a second embodiment of a planar light source device according to the present invention. A planar light source device shown in FIG. 13 is composed of a planar transparent light guide member 31 having a corner-cut portion 39, a case frame 33 for covering the five side faces of the light guide member 31, a high-reflectivity reflector plate 34 to be arranged on the rear face of the light guide member 31, a bottom plate 35 arranged on the rear face of the reflector plate 34 and an optical diffuser sheet 36 to be arranged on the top face (light emitting face) of the light guide member 31.

The light guide member 31 is provided with a first LED module 32a and a second LED module 32b which are light sources for inputting light into the light guide member 31 through an end face of it.

The first LED module 32a is provided in the middle of a short side face of the light guide member 31, the second LED module 32b is provided on the corner-cut portion 39 of the light guide member 31. The first LED module 32a and the second LED module 32b each have three LED's of R (red), G (green) and B (blue) being close to one another inside it.

The light guide member 31 is 27 mm×58 mm×3.5 mm in size. And the light guide member 31 has the corner-cut portion 39 obtained by cutting a corner at an inclination angle θ in the exit direction of light of the first LED module 32a relative to the short side direction at the side where the first LED module 32a is arranged. The light guide member 31 is made of transparent acrylic resin. A light scattering member pattern comprising white circular dots is formed by printing on the rear face of the light guide member 31.

A white polycarbonate material is used as the case frame 33 for covering the light guide member and the bottom plate 35, and an optical diffuser film (100GM2 made by Kimoto) is used as the optical diffuser sheet 36.

The reflector plate 34 is made of a high-reflectivity material such as a mirror or aluminum thin film for example. It is preferable that the reflectivity (reflected light/incident light) of the reflector plate 34 is not less than 90%.

Figure 14:
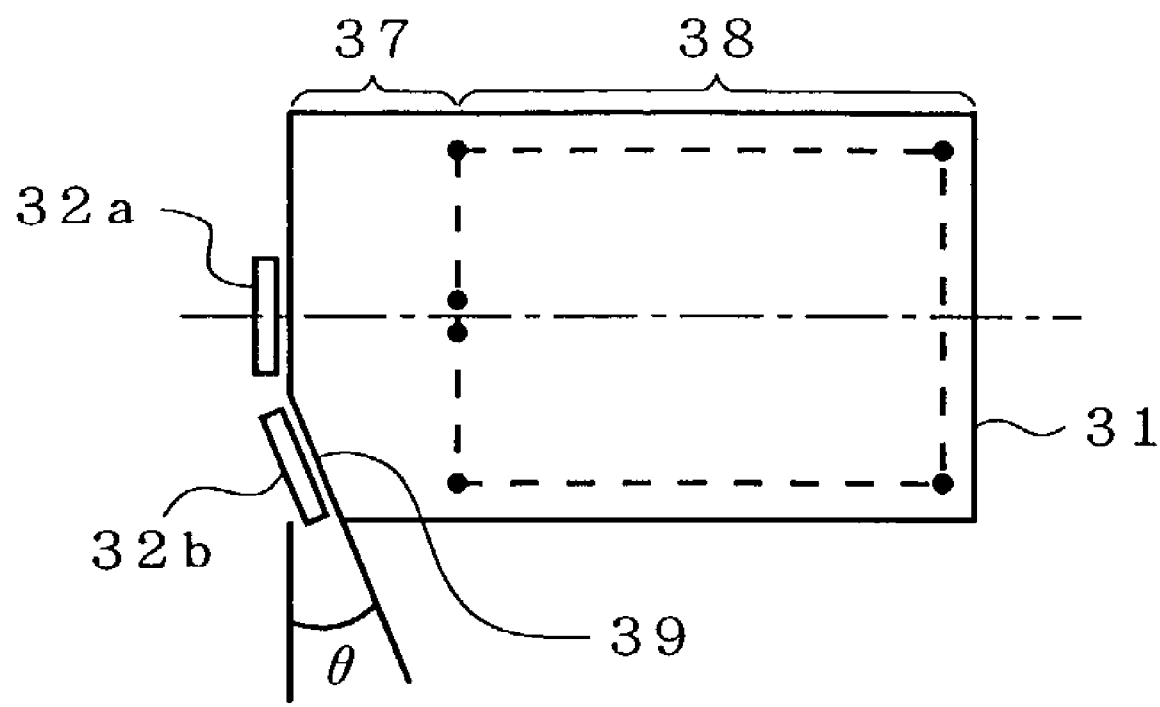
FIG. 14 is a plan view of a light guide member seen from the rear face of it.

FIG. 14 is a plan view of the light guide member 31 seen from the rear face (printed face) side. The rear face of the light guide member 31 is composed of an area having no light scattering members (or area little scattering light), namely, an ineffective area 37 and a printed area 38 having a light scattering member pattern comprising white circular dots printed on it, as shown in FIG. 13. The light guide member 31 is 58 mm in length in the light outputting direction of the first LED module 32a. The ineffective area 37 is provided over a distance of 10 mm in the vicinity of the first LED module 32a, while the printed area 38 is provided over a range of 10 mm to 58 mm from the first LED module 32a in the light outputting direction of the first LED module 32a.

The light guide member 31 has the corner-cut portion 39 obtained by cutting the corner at an inclination angle θ in the exit direction of light of the first LED module 32a relative to the short side direction. The first LED module 32a is provided in the middle of a short side face of the light guide member 31, and the second LED module 32b is provided on the corner-cut portion 39 of the light guide member 31.

FIG. 15 is a diagram showing the relative positions of a light scattering member pattern formed on a printed area of the rear face of the light guide member and LED modules. It is a white circular dot that is shown by black, which is high in reflectivity. Although a light scattering member pattern is formed out of circular dots here, it is not necessarily limited to circular dots but may be in many variant shapes such as square, rhombus and the like.

The fist LED module 32a is provided in the middle of the short side face of the light guide member 31 and outputs light to an area where light scattering members are sparse (area being smaller in area occupied by white circular dots per unit area). The second LED module 32b is adjacently provided to the first LED module 32a and outputs light to an area where light scattering members are sparse (area being smaller in area occupied by white circular dots per unit area) at an angle θ inclined to the light outputting direction of the first LED module 32a.

FIGS. 16 to 19 show results of measuring in-surface luminance distributions obtained by applying an electric current to LED modules to make a planar light source device emit light, said planar light source device having a light emitting surface of 25 mm×44 mm in size and being composed as described above. These LED modules were arranged at a side having a larger numerical value in the x-axis (at the 44-mm side in the figures) of the light guide member. Model BM7 made by TOPOCON was used as a luminance meter. The case of using LED's of R (red) as the first and second LED modules is described. In FIGS. 16 to 19, a light emitting surface is represented by the x-y coordinates and one corner of the light emitting surface is taken as the-origin of the coordinates, and the pitch of measurement is set as 1 mm by dividing the x-axis into 43 equal parts and the y-axis into 23 equal parts. The ordinate represents measured luminance (unit: cd/m$^2$).

Figure 16:
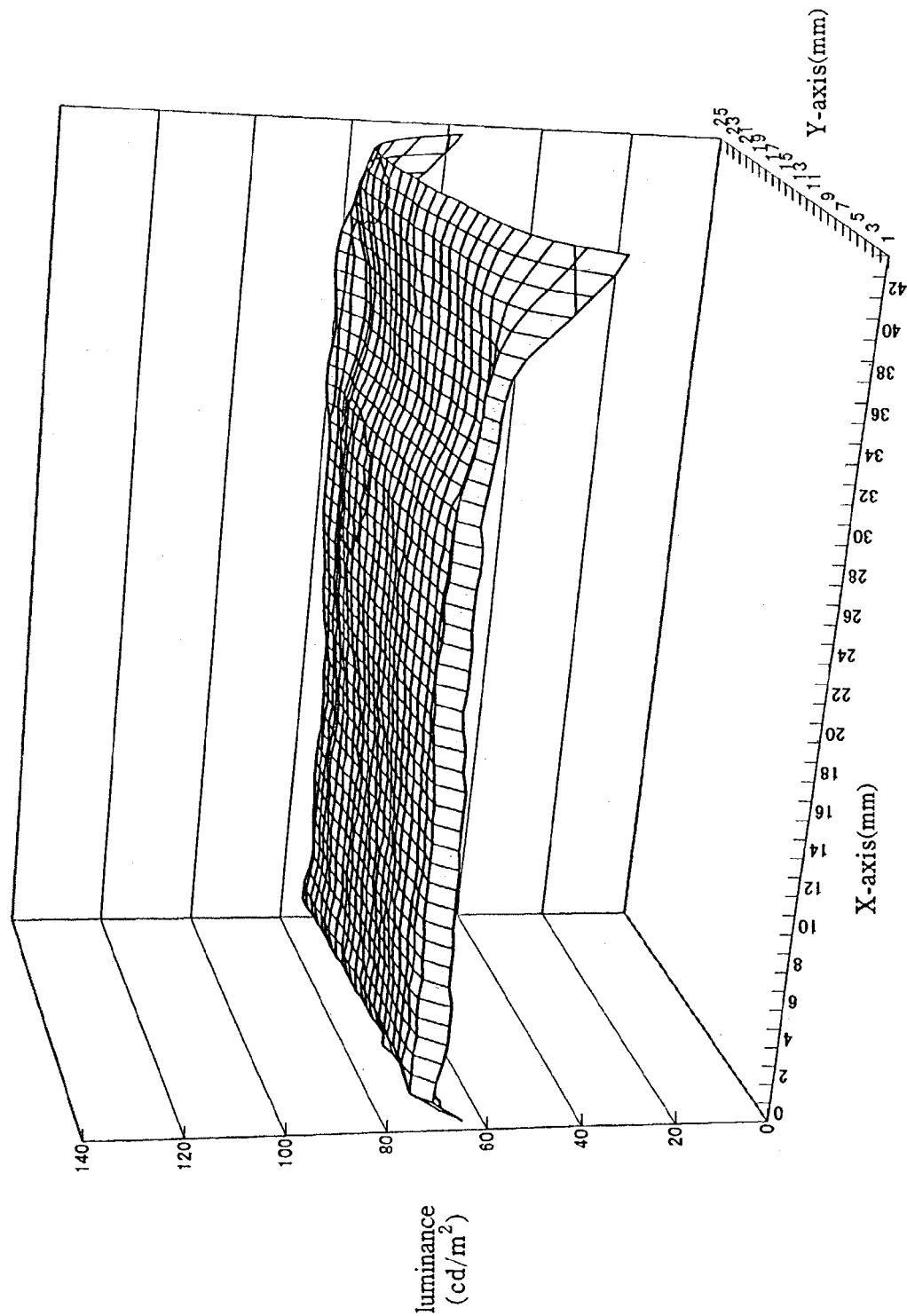
FIG. 16 is a diagram showing the optical characteristic of a first LED module in case that the face having a second LED module installed on it is inclined at 15° to the face having the first LED module installed on it.
Figure 17:
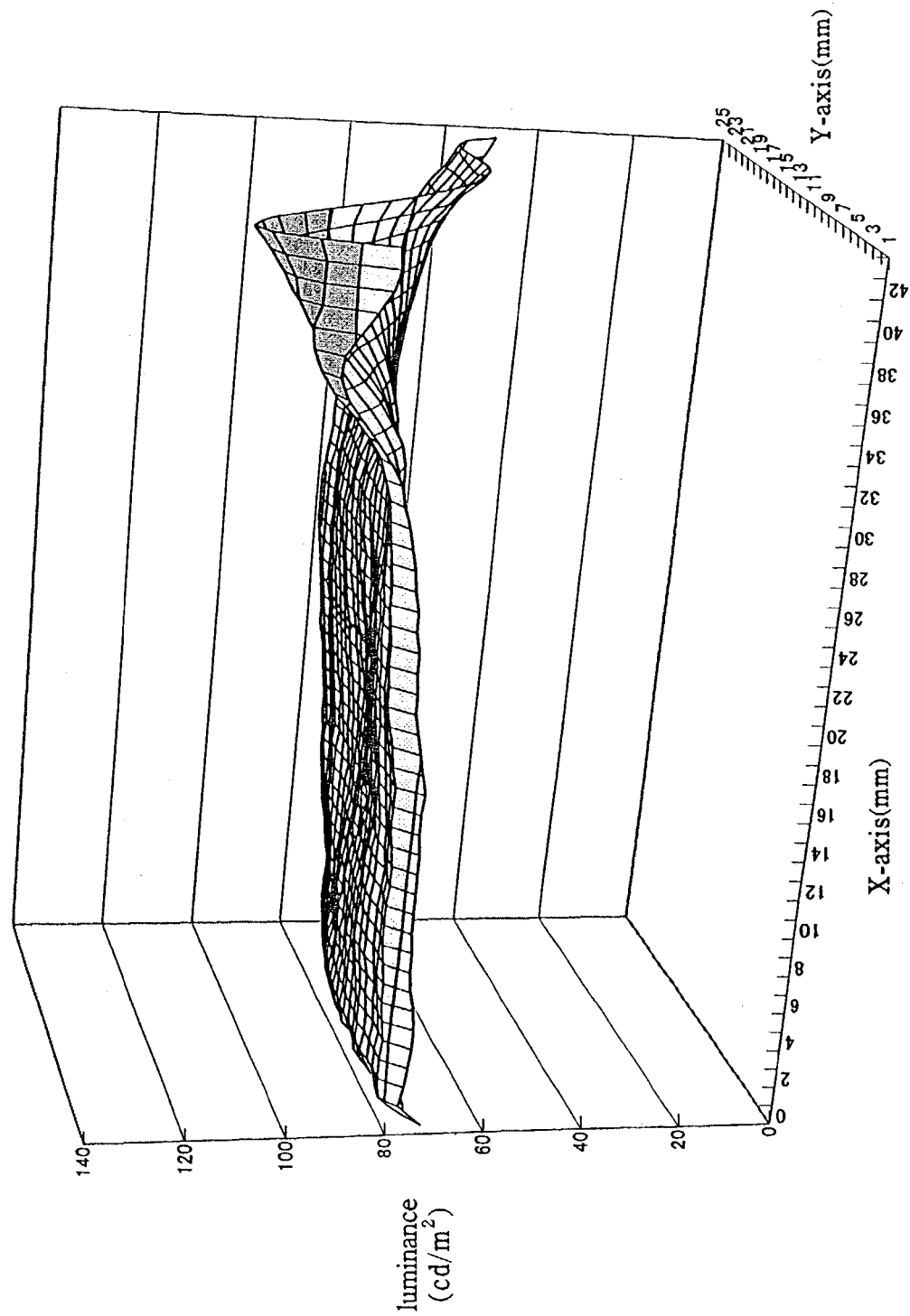
FIG. 17 is a diagram showing the optical characteristic of the second LED module in case that the face having the second LED module installed on it is inclined at 15° to the face having the first LED module installed on it.

FIGS. 16 and 17 show the optical characteristics of the first and second LED modules respectively in case that the face having the second LED module installed on it is inclined at an angle of 15° to the face having the first LED module installed on it. As shown in FIG. 16, the in-surface luminance distribution of the first LED module is comparatively flat. And, as shown in FIG. 17, the in-surface luminance distribution of the second LED module also provides a comparatively uniform distribution although it has a peak in the vicinity of the LED module.

Figure 18:
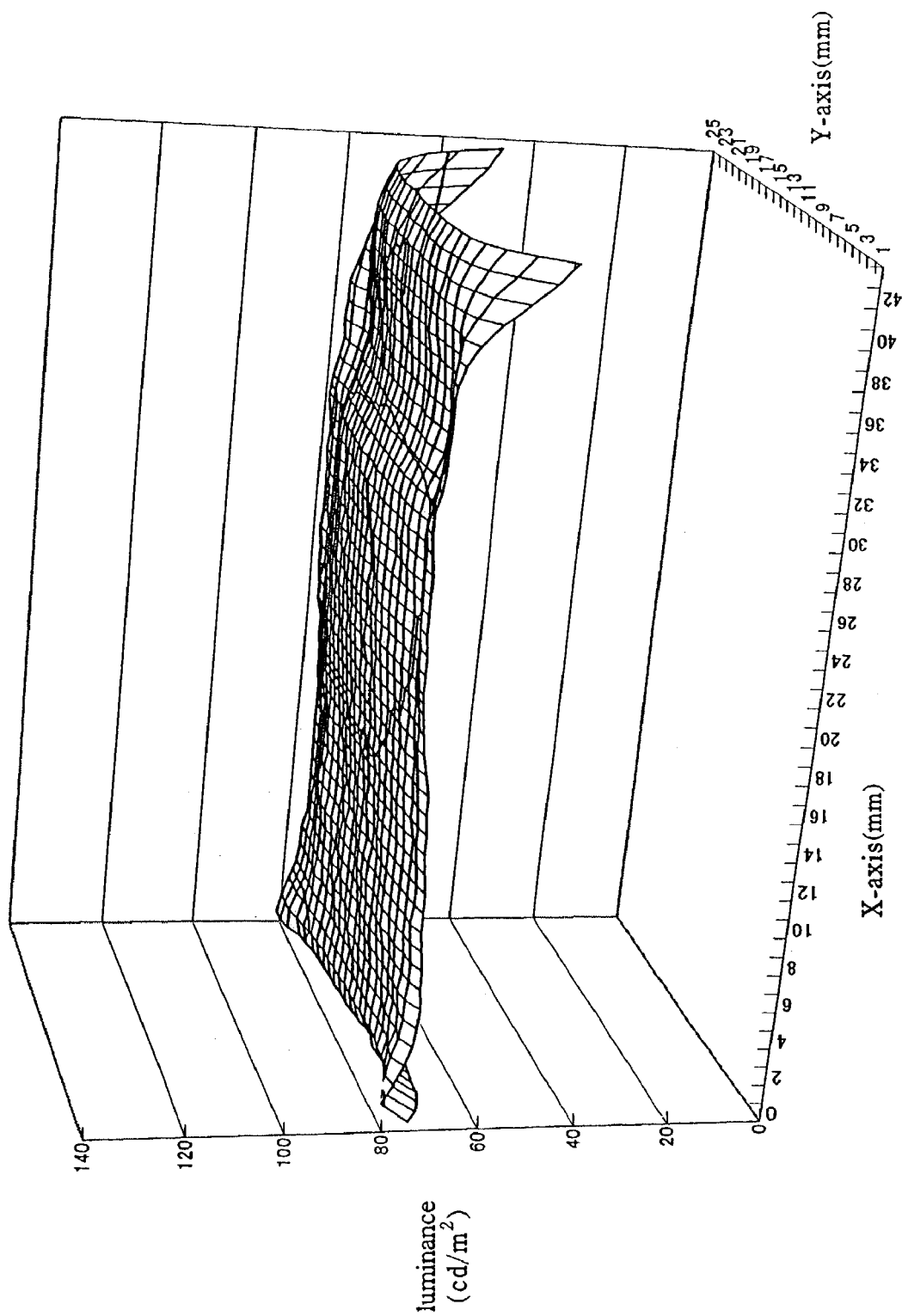
FIG. 18 is a diagram showing the optical characteristic of the first LED module in case that the face having the second LED module installed on it is not inclined to the face having the first LED module installed on it.

On the other hand, FIGS. 18 and 19 show respectively the optical characteristics of the first and second LED modules in case that the face having the second LED module installed on it is not inclined to the face having the first LED module installed on it. As shown in FIG. 19, the in-surface luminance distribution of the second LED module has a large peak in the vicinity of the LED module, and is remarkably worse in comparison with the optical characteristic of the second LED module shown in FIG. 17.

From the result of measuring in-surface luminance distributions shown in FIGS. 16 to 19, the following matters are known. As shown in FIGS. 16 and 18, the first LED module does not vary in optical characteristic whether or not the light guide member has a corner-cut portion. The reason is that the light coming into the light guide member (medium of about 1.5 in refractive index) propagates into the middle part as almost keeping its directivity and no light reaches the corner-cut portion, and therefore the luminance distribution is not influenced by the corner-cut portion.

On the other hand, comparing FIG. 17 with FIG. 19, it is known that the peak in the vicinity of the second LED module is made remarkably smaller in FIG. 17 than that in FIG. 19, by inclining the second LED module at an angle of 15° to the first LED module. The reason is that the light from the second LED module 32b is outputted into an area where light scattering members are sparse, as shown in FIG. 15. In case that the second LED module is inclined at 15° to the first LED module, most of the light from the second LED module arranged on the corner-cut portion results in avoiding printed light scattering members in the vicinity of the LED module, said members providing a large optical peak, and proceeding to somewhat far light scattering members, and providing well-balanced light scattering as a whole, as shown in FIG. 17.

Accordingly, the present invention can realize an LED planar light source making it possible to use many kinds of LED's and increase the quantity of light by outputting light into an area where light scattering members are sparse through inclining the second LED module to the first LED module.

As shown in FIG. 17, since a peak of quantity of light appears in the vicinity of the second LED module, it is also acceptable to avoid the use of an area being irregular in luminance by covering the area being irregular in luminance with a light shielding plate (light shielding plate for covering an area having a peak at the LED module side) 30 shown in FIG. 12.

The inclination angle of the second LED module can range from 1° to less than 45°, and preferably ranges from 5° to 30°. The present invention is characterized by being provided with a plurality of LED modules which are inclined at an angle to one another so as to output light into an area where light scattering members are sparse as shown in FIG. 15. Since a small inclination angle makes long the distance from an LED module to a light scattering member pattern and makes a planar light source need a large unnecessary portion due to a weak intensity of emitted light over this distance, this is not preferable. And since an inclination angle being not less than 45° makes it difficult for light to propagate in the longitudinal direction, this is not preferable as well.

As shown in FIG. 15, the second embodiment outputs the light from an LED module into an area where light scattering members are sparse by means of a light scattering member pattern varying two-dimensionally. It is preferable to incline the second LED module to the first LED module and output light into the middle of the light guide member. It also applies in case of using a light scattering member pattern varying one-dimensionally in the longitudinal direction without varying two-dimensionally, said light scattering member pattern simply becoming sparser at a position closer to the LED module and more dense at a position farther from the LED module.

Although the second embodiment provides a corner-cut portion in a light guide member and disposes a second LED module on the corner-cut portion and thereby inclines the second LED module to the first LED module, it is not always necessary to provide a corner-cut portion in a light guide member but the second LED module may be arranged in any manner making it possible to incline the second LED module to the first LED module and output light into an area where light scattering members are sparse. For example, the second LED module may be arranged slantly on a case frame.

Figure 20:
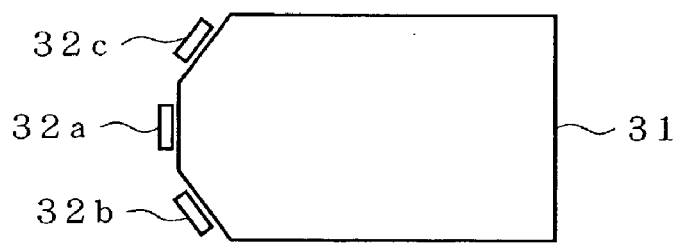
FIG. 20 is a diagram showing a planar light source device provided with a third LED module.

In addition, the second embodiment arranges the first LED module 32a and the second LED module 32b on the light guide member 31 so as to incline the light outputting direction of the second LED module 32b to the light outputting direction of the first LED module 32a, but further it is possible to more improve the uniformity by arranging a third LED module 32c on the light guide member 31 as shown in FIG. 20. At this time, if the quantity of light is made larger in the middle part, it is also acceptable to use only the second and third LED modules 32b and 32c without using the first LED module 32a.

Figure 21:
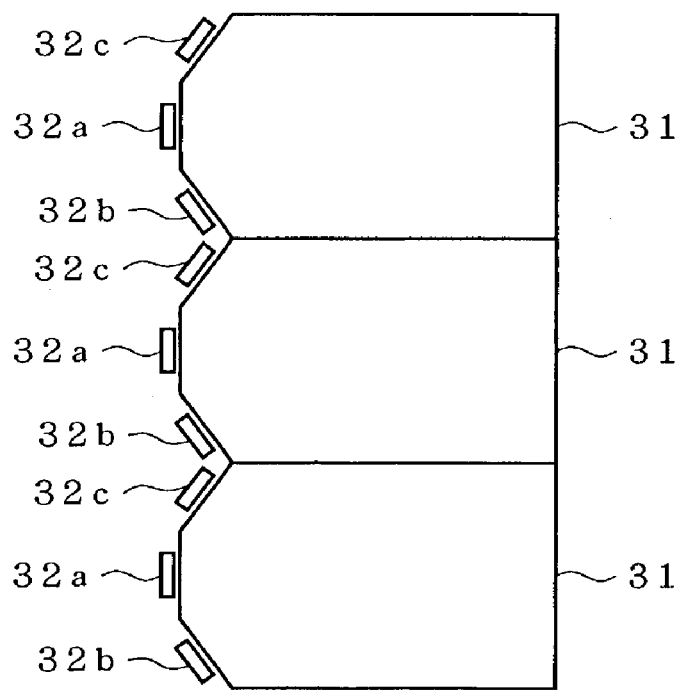
FIG. 21 is a diagram showing a large-sized planar light source device having a plurality of planar light sources arranged on it.

Further, as shown in FIG. 21, it is possible to provide a large-sized planar light source device by arranging a plurality of planar light sources shown in FIG. 20. That is to say, a light source being n times in size can be made by arranging n light sources.

Moreover, in the first and second embodiments, with regard to an LED module provided with LED's of R, G and B, the optical characteristic of an LED of R (red) was described, but since the LED's of R, G and B are provided closely to one another, the same thing also applies in case of using the LED's of G (green) and B (blue). Then, a similar result was obtained.

Furthermore, in case of measuring infrared LED's provided in the first and second LED modules by means of an infrared luminance meter as well, a similar result to this embodiment was obtained. Moreover, in case of measuring ultraviolet LED's provided in the first and second LED modules by means of an ultraviolet luminance meter, a similar result to this embodiment was obtained. Furthermore, in case of substituting an infrared or ultraviolet LED for a visible light LED, since the refractive index of a light guide member does not depend on wavelength, a similar result to the case of a visible light was obtained.

Besides, in case of making the first LED module be provided with LED's of R, G and B and the second LED module as well be provided with LED's of R, G and B, and making the respective LED's having the same color out of R, G and B emit light synchronously with each other, since the first and second LED modules emit the same color, the quantity of light can be increased. The number of LED modules is not limited to two but may be three or more.

Here, a planar light source capable of emitting R, G, B and infrared lights can be provided by providing the first LED module with LED's of R, G and B and providing the second LED module with an infrared LED. And a planar light source capable of emitting R, G, B and ultraviolet lights can be provided by providing the first LED module with LED's of R, G and B and providing the second LED module with an ultraviolet LED.

Since the number of LED modules is not limited to two but may be three or more, a planar light source capable of emitting R, G, B, infrared and ultraviolet lights can be provided by providing the first LED module with LED's of R, G and B, providing the second LED module with an ultraviolet LED, and further providing the third LED module with an ultraviolet LED.

Next, an image reading device utilizing a planar light source device according to the first or second embodiment described above is described.

FIG. 22 is a sectional view showing an example of an image reading device utilizing a planar light source device as described above.

An image reading device shown in FIG. 22 comprises a contact-type image sensor 46 provided in a case 43, the top face of which is composed of an original stand glass plate 45. A film original 47 is placed on the original stand glass plate 45, and a planar light source device 48 according to an embodiment as described above is place above the film original 47. This planar light source device 48 is built in an original pressing lid (not illustrated) or is substituted for an original pressing lid when reading the film original.

The contact-type image sensor 46 has a rod lens array 49 and a linear sensor 42 built in it, and is arranged closely to the original stand glass plate 45. And this contact-type image sensor 46 has a linear illumination device 44 necessary for reading a paper original built in it and the linear illumination device is turned off in case of reading a film original.

The contact-type image sensor 46 is driven reciprocatively in fixed directions to read-scan an original. The light emitted from the planar light source device 48 passes through the film original 47 and enters the linear sensor 42 through the rod lens array 49.

As described above, in a planar light source having a plurality of LED modules having the same exit angle of emitted light arranged apart from one another, the present invention can remove irregularity in luminance distribution in the vicinity of the LED modules by providing an area having no light scattering members in the vicinity of the LED modules and can arrange a plurality of LED modules and thereby can realize an LED planar light source capable of using many kinds of LED's and increasing the quantity of light.

The present invention can remove irregularity in luminance distribution in the vicinity of an LED module by outputting the light from the LED module into an area where light scattering members are sparse, and thereby can realize an LED planar light source capable of using many kinds of LED's and increasing the quantity of light.

What is claimed is:

1. A planar light source device comprising:
   a light guide member having a front face, a rear face and an end face, the rear face having light scattering members for scattering light, and the end face having at least one corner-cut portion;
   at least one first light source on the corner-cut portion; and
   at least one second light source arranged on the portion of the end face other than the corner-cut portion; wherein
   said light guide member includes a first area having no light scattering members, the first area being smaller in area than a second area of the light guide member occupied by the light scattering members on the rear face of the light guide member, the second area extending between the first area and at least one edge of the rear face, the first area introducing light from the first and second light sources into the light guide member, and whereby the light scattered by said light scattering members is emitted from the front face of the light guide member.

2. A planar light source device comprising;
   a light guide member having a front face, a rear face, and an end face, the rear face having light scattering members for scattering light, and the end face having at least one corner-cut portion;
   at least one first light source arranged on the corner-cut portion; and
   at least one second light source arranged on a portion of the end face other than any corner-cut portion of the at least one corner-cut portion; wherein
   said light guide member include an area adjacent to the end face where said light scattering members are sparse, the light from the first and second light sources being introducing into the light guide member through the area, and whereby the light scattered by said light scattering members is emitted from the front face of the light guide member.

3. A planar light source device comprising;
   a light guide member having a front face, a rear face, and an end face, the rear face having light scattering members for scattering light, and the end face having a first corner-cut portion and a second corner-cut portion;
   a first light source arranged on the first corner-cut portion;
   a second light source arranged on the second corner-cut portion; and
   a third light source arranged on the portion of the end face between the first and second corner-cut portions: wherein
   said light guide member includes a first area having no light scattering member, the first area being smaller in area than a second area of the light guide member occupied by the light scattering members on the rear face of the light guide member, the second area extending between the first area and at least one edge of the rear face, the first area introducing light from the first, second and third light sources into the light guide member, and whereby the light scattered by said light scattering members is emitted from the front face of the light guide member.

4. A planar light source device comprising;
   a light guide member having a front face, a rear face, and an end face, the rear face having light scattering members for scattering light, and the end face having a first corner-cut portion and a second corner-cut portion;
   a first light source arranged on the first corner-cut portion;
   a second light source arranged on the second corner-cut portion; and
   a third light source arranged on the portion of the end face between the first and second corner-cut portions: wherein
   said light guide member includes an area adjacent to the end face where said light scattering members are sparse, the light from the first, second and third light sources being introduced into the light guide member through the area, and whereby the light scattered by said light scattering members is emitted from the front face of the light guide member.

5. A planar light source device according to one of claims 1 to 4, wherein said light sources are a plurality of light sources having the same color.

6. A planar light source device according to one of claims 1 to 4, wherein said light sources include at least one of an infrared light source or an ultraviolet light source.

7. A planar light source device according to one of claims 1 to 4, wherein said light sources include a visible light source and an infrared light source.

8. A planar light source device according to one of claims 1 to 4, wherein said light sources include a visible light source and an ultraviolet light source.

9. A planar light source device according to one of claims 1 to 4, wherein said light sources include a visible light source, an infrared light source and an ultraviolet light source.

10. A large-sized planar light source device comprising at least two planar light sources according to claim 3 or 4 arranged side by side in such a manner that the side faces of respective planar light sources are neighbored to each other.

11. An image reading device using a planar light source device according to one of claims 1 to 4.

12. An image reading device using a large-sized planar light source device according to claim 10.

* * * * *